United States Patent

[11] 3,625,795

[72] Inventors Donald P. Knechtges
 Middleburg Heights;
 Andrew N. Mayak, Elyria, both of Ohio
[21] Appl. No. 888,946
[22] Filed Dec. 29, 1969
[45] Patented Dec. 7, 1971
[73] Assignee The B. F. Goodrich Company
 New York, N.Y.

[54] SPRAY PROCESS FOR DEPOSITING ADHESIVE AND BONDING LAMINATES
 11 Claims, No Drawings
[52] U.S. Cl. .................................................. 156/291,
 117/37, 117/104, 117/163, 156/331, 161/88, 161/148
[51] Int. Cl. ...................................................... B32b 7/14, B05c 3/20
[50] Field of Search ............................................. 117/6, 104, 163, 37; 161/88, 148; 156/290, 291, 331

[56] References Cited
UNITED STATES PATENTS
2,116,289  5/1938  Shepherd ..................... 118/212
3,516,897  6/1970  Brodnyan ...................... 161/88 X
2,249,205  7/1941  Hansen .......................... 117/163
2,595,342  5/1952  Dosmann ...................... 117/163 X
3,434,862  3/1969  Luc ............................... 117/37 R X FOREIGN PATENTS
601,395  5/1948  Great Britain ................. 117/104 A Primary Examiner—William J. VanBalen
Assistant Examiner—Roger L. May
Attorneys—J. Hughes Powell, Jr. and Ernest K. Bean ABSTRACT: A spray process for the deposition of carboxyl-containing adhesive latices as discrete droplets wherein the droplets are maintained as raised, spaced deposits on the substrate for lamination is provided. The adhesive latex is sprayed at a low viscosity but prior to contact with the substrate the viscosity of the latex droplets is increased so that upon striking the substrate the droplets remain as raised, spaced deposits rather than coalescing to form a continuous adhesive layer or being absorbed by the substrate. Laminates obtained with the present spray process have increased resistance to delamination, good flexibility and hand.

SPRAY PROCESS FOR DEPOSITING ADHESIVE AND BONDING LAMINATES

BACKGROUND OF THE INVENTION

Laminates obtained by bonding together two or more layers of material with spaced deposits (discrete spots) of latex adhesive are generally recognized to be superior to laminates obtained employing a continuous layer of the latex binder. With fabric laminates, for example, significant improvements in flexibility, hand and breathability are obtained by employing the "dot" bonding technique.

Various mechanical means have been used to apply spaced deposits of the latex bonding agent to materials to be laminated Perforated, grooved and patterned transfer rolls or screens in combination with a doctoring means and other similar devices which, as a result of mechanical shear action cause the bonding agent to be deposited at spaced intervals on the substrate, are the most common. However, these mechanical techniques are not completely satisfactory. The cost of such machinery is high, the rate of application is limited and application is restricted to flat or regular surfaces.

With transfer roll methods of application the adhesive latex must be specifically formulated to the proper viscosity and rheology prior to application. The rheological requirements of the thickened latex bonding agent will vary depending on the particular transfer means employed, the rate of application, the amount of pickup desired and other factors. Further, the rheological properties of the formulated latex may vary if it is not used promptly. Improper latex viscosity can result in either too much or too little of the binder being applied. If insufficient latex binder agent is applied, the bond will fail. When too much bonding agent is used, the physical characteristics of the laminate approach those of conventional laminated materials, that is, laminates bonded with a continuous binder layer.

A simple, quick, convenient and economical process for depositing discrete droplets of the bonding agent, such as a spray process, is desirable. A spray process giving adhesive bonds equivalent to or better than conventional mechanical means would eliminate or at least minimize the preapplication formulation of the latex binder and eliminate the problems associated with rheological changes of the latex upon aging. A spray technique would also permit application of spaced deposits of binder latex not only to flat surfaces, but to curved and irregular surfaces as well.

A spray process capable of applying an adhesive latex as raised, spaced deposits has not been previously available. Primarily this has been due to two basic requisites for such a process which, heretofore, have been considered as mutually exclusive—first, that the latex have a very low viscosity as it is sprayed and, second, that the latex droplets upon contact with the substrate have a very high viscosity. It is considered that for a binder latex to be sprayed with any degree of uniformity by conventional means the viscosity should not exceed about 2,000 centipoise (c.p.s.). If the latex adhesive droplets are allowed to contact the substrate in such an unthickened state, they do not remain as individual or discrete deposits but coalesce to produce a continuous adhesive layer or, with certain types of substrates, the latex will be absorbed.

SUMMARY OF THE INVENTION

We have now discovered a spray process for the application of discrete deposits of latex adhesives. Laminates of the present invention bonded together by a discontinuous, high viscosity adhesive layer applied by spraying have much greater resistance to delamination than laminates obtained wherein the bonding agent is present as a continuous film. Additionally, and quite unexpectedly, laminates prepared in accordance with the present invention have much improved resistance to delamination compared with those obtained by mechanical processes which also apply the bonding agent as spaced deposits. In the present process, a latex adhesive containing carboxyl functionality and having a viscosity less than about 2,000 c.p.s. is sprayed with a conventional spray apparatus. Prior to striking the surface of the substrate the viscosity of the latex is increased so that the individual droplets remain as raised, spaced deposits rather than coalescing to form a continuous film or being absorbed by the substrate. Since the bonding agent is present as raised, discrete deposits, more efficient utilization of the bonding agent is obtained. The amount of latex adhesive necessary to obtain satisfactory lamination can therefore be reduced while maintaining acceptable laminate adhesive strengths.

The improved laminates of the present invention are obtained by spraying an aqueous polymer latex containing about 0.01 to 25 percent by weight carboxyl functionality, based on the total polymer composition, so that discrete droplets having an average diameter of about 0.0005 inch to about 0.05 inch are present. The adhesive latex is sprayed through a basic atmosphere containing sufficient concentration of a volatile basic compound such as ammonia or amine containing up to about 20 carbon atoms to insure an increase in the viscosity of the adhesive latex droplet to at least 10,000 c.p.s.

DETAILED DESCRIPTION

Laminates having improved resistance to delamination are obtained when an aqueous polymer latex containing carboxyl functionality is sprayed onto the material to be laminated so that the adhesive latex droplets are deposited as discrete, raised spots rather than as a continuous film. The amount of carboxyl functionality necessary to achieve the desired result will be about 0.01 to 25 percent by weight based on the total polymer composition. The necessary carboxyl functionality is obtained by polymerizing in an aqueous medium one or more $\alpha,\beta$-olefinically unsaturated carboxylic acid monomers (hereinafter called acid monomers) and one or more other polymerizable vinylidene ($H_2C\ C\ $) monomers. Acid monomers employed in the polymerization preferably contain from about 3 to 12 carbon atoms. Such acid monomers include: Acrylic acid, methacrylic acid, ethacrylic acid, $\alpha$-chloroacrylic acid, $\alpha$-cyanoacrylic acid, crotonic acid, $\beta$-acryloxypropionic acid, hydrosorbic acid, sorbic acid, $\alpha$-chlorosorbic acid, cinnamic acid, $\beta$-styrylacrylic acid, itaconic acid, citraconic acid, maleic acid, fumaric acid, mesaconic acid, aconitic acid and the like. Although any $\alpha,\beta$-olefinically unsaturated carboxylic acid monomer can be employed, best results are obtained with mono-carboxylic monomers containing from three to six carbon atoms such as acrylic acid, methacrylic acid, crotonic acid, ethacrylic acid and the like. Carboxylic polymer lattices prepared from acrylic acid and methacrylic acid have proved especially effective for use in the present invention. Mixtures of one or more of the above-mentioned acid monomers may be employed if desired.

Although certain lattices are better suited for use with the spray process and superior to other lattices based on a variety of considerations, so long as the requisite amount of carboxyl functionality is present in the binder latex, the latex will be acceptable for use with the present spray process. Thus, numerous variations of the polymerization process for the interpolymerization of the acid monomers with the other vinylidene monomers are possible. The $\alpha,\beta$-olefinically unsaturated carboxylic acid monomers may be conventionally copolymerized, overpolymerized, block polymerized or grafted to obtain suitable polymer lattices. Such techniques may be employed where only one polymer system is used as the adhesive latex or where two or more polymer lattices are blended to obtain the adhesive latex. In the latter case, it is not necessary that all the polymer systems contain carboxyl functionality. An acid monomer may therefor be interpolymerized employing any of the above-described processes and this resulting polymer latex blended with one or more other polymer lattices containing no carboxyl functionality.

When the adhesive latex is comprised of a single polymer it will preferably contain an acrylic ester polymerized with the acid monomer and generally one or more other vinylidene monomers. Excellent binder lattices are obtained when the polymer contains a predominant amount of an ester of an $\alpha,\beta$-olefinically unsaturated carboxylic acid having the structural formula

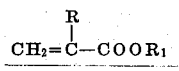

wherein R is hydrogen, methyl or an ethyl group and $R_1$ is a hydrocarbon radical containing from one to 12 carbon atoms. Acrylic esters of the above type include methyl acrylate, ethyl acrylate, propyl acrylates, hexyl acrylates, cyclohexyl acrylate, phenyl acrylate, n-octyl acrylate, 2-ethylhexyl acrylate, methyl methacrylate, ethyl methacrylate, cyclohexyl methacrylate, 2-ethylhexyl methacrylate, methyl ethacrylate, ethyl ethacrylate, and the like. Highly useful polymer lattices are obtained when the acrylic ester is derived from acrylic or methacrylic acid and an aliphatic alcohol containing from one to eight carbon atoms, that is $R_1$ is an alkyl group containing from one to eight carbon atoms.

One or more other polymerizable comonomers of the vinylidene type can be polymerized with the acrylic ester and acid monomers. Such comonomers may constitute up to about 49.5 percent by weight of the total polymer composition. Such copolymerizable monomers include conjugated dienes such as butadiene, isoprene and piperylene; $\alpha$-olefins such as ethylene, propylene, butene-1, and 4-methylpentene-1; vinyl aromatics such as styrene, $\alpha$-methyl styrene, and vinyl toluene; vinyl halides such as vinyl fluoride, vinyl bromide and vinylidene chloride; vinyl esters such as vinyl acetate; alkyl vinyl ethers such as methylvinyl ether, isopropylvinyl ether and n-butylvinyl ether; N-alkylol amides of $\alpha,\beta$-olefinically unsaturated carboxylic acids such as N-methylol acrylamide, N-ethanol acrylamide, N-propanol acrylamide, N-methylol methacrylamide, N-ethanol methacrylamide, N-methylol maleimide N-methylol maleamide and the like; N-alkoxyalkyl amides of $\alpha,\beta$-olefinically unsaturated carboxylic acids such as N-methoxymethyl acrylamide, N-methoxyethyl acrylamide, N-butoxymethyl acrylamide, N-butoxymethyl methacrylamide and the like; amides of $\alpha,\beta$-olefinically unsaturated carboxylic acids such as acrylamide, methacrylamide, N-methyl acrylamide, N-t-butyl acrylamide, diacetone acrylamide, N-methyl methacrylamide, N-ethyl methacrylamide and the like; acrylonitrile, methacrylonitrile and cyanoalkyl acrylates such as $\alpha$-cyanomethyl acrylate and the $\alpha$-, $\beta$- and $\gamma$-cyanopropyl acrylates; and the like. Additionally, polyfunctional comonomers, that is, monomers containing more than one group capable of polymerization, such as methylene bisacrylamide, ethyleneglycol dimethacrylate, diethylene glycol diacrylate, allyl pentaerythritol, divinylbenzene and the like, may be advantageously employed in small amounts where highly cross-linked polymer lattices are desired.

Extensive variations of the polymer composition is possible and often advantageous if optimum bond strengths are to be developed in the laminate. Thus, the particular monomers employed and the polymerization technique used will play an important role in the ultimate polymer composition and particularly the amount of acid monomer present. For example, it has been found that with polymer lattices prepared by overpolymerization, smaller amounts of acid monomer can be employed to achieve the same degree of reactivity obtained with conventionally copolymerized lattices having the same general overall composition with respect to the other monomers present.

The polymer latex compositions useful for the present spray process if prepared employing conventional copolymerization processes will contain from about 50 to 99.5 percent of one or more of the ester of the $\alpha,\beta$-olefinically unsaturated carboxylic acid interpolymerized with about 0.05 to 20 percent by weight of the acid monomer. Additionally, up to about 49 percent by weight of one or more vinylidene comonomers can be interpolymerized therewith. Excellent results have been obtained with binder lattices of polymers containing from about 70 to 95 percent by weight of the acrylic ester, about 0.1 to 10 percent by weight of the acid monomer and about 5 to 29 percent by weight of the copolymerizable vinylidene comonomer.

The conventional copolymerization processes referred to above can be any of those processes which are well known to the art. The aqueous polymerization medium may be emulsifier free or it may contain an emulsifying agent. When an emulsifier is used to prepare the binder lattices it will range up to about 6 percent or more by weight based on the total monomers to be polymerized. Emulsifier may be totally charged at the outset of the polymerization or added incrementally or proportioned into the polymerizer throughout the run. Any of the known anionic, cationic or nonionic emulsifier compounds can be employed, however, superior polymerizations are generally obtained with anionic emulsifiers. Such anionic emulsifiers include the alkali metal or ammonium sulfates of alcohols containing from about 8 to 18 carbon atoms such as sodium lauryl sulfate; alkali metal and ammonium salts of sulfonated petroleum or paraffin oils; salts of aromatic sulfonic acids such as dodecane-1-sulfonic acid and octadiene-1-sulfonic acid; aralkylene sulfonates such as sodium isopropyl benzene sulfonate and sodium dodecyl benzene sulfonate; alkali metal and ammonium salts of sulfonates dicarboxylic acid esters such as sodium dioctasulfosuccinamate and disodium-N-octadecyl sulfosuccinamate; alkali metal or ammonium salts of the acids of complex organic mono- and diphosphate esters; and the like. Useful cationic emulsifiers include the salts of strong inorganic acids and organic bases containing long hydrocarbon chains such as lauryl amine hydrochloride, diethylaminoethyldecyl amine, decylamine hydrochloride, trimethylethyl ammonium bromide, dodecyltrimethyl ammonium bromide and the like. Nonionic emulsifiers such as octyl- or nonyl- phenol polyethoxy ethanol may also be employed. For the preparation of the polymer lattices alkali metal salts of the aromatic sulfonic acids and the alkali metal salts of the aralkyl sulfonates are most commonly used. In addition to the above-mentioned emulsifiers it is sometimes advantageous to add post-polymerization emulsifiers to the resulting polymeric latex binders to improve the latex stability if it is to be stored for a prolonged period prior to spraying. Such post-polymerization emulsifiers may be the same as, or different than, the emulsifier employed during the polymerization.

The polymerizations are generally initiated with radical initiators, but such initiators are not always necessary depending on the monomers polymerized. When an initiator is employed a more uniform and controllable polymerization is usually obtained. Commonly used initiators include the various peroxygen compounds such as the persulfates, benzoyl peroxide, t-butylhydroperoxide, 1-hydroxycyclohexyl hydroperoxide, azo compounds such as azodiisobutyronitrile and dimethylazoisobutyrate and the like. Especially useful initiators are the water soluble peroxygen compounds such as hydrogen peroxide and sodium, potassium and ammonium persulfates. When alkaline metal and ammonium persulfates are employed it will often be in an activated redox system. Typical redox systems include the persulfates in combination with a reducing substance such as a polyhydroxy phenol and an oxidizable sulfur compound such as sodium sulfite or sodium bisulfite, a reducing sugar, a diazomercapto compound, a ferricyanide, dimethylamino propionitrile or similar compounds. Heavy metal ions such as silver, cupric, iron, cobalt, nickel and others may also be employed as activators with persulfate catalysts. About 0.1 to about 5 percent by weight initiator based on the total monomers will be employed. The initiator may be charged completely at the outset of the polymerization, however, incremental addition or proportioning of the initiator is sometimes advantageous to obtain a more uniform polymerization rate.

The polymerization is normally conducted by charging the monomers to be polymerized into the polymerizer which already contains the water and the emulsifying agent. The reactor and its contents are then heated and the polymerization initiator charged. The polymerization temperature is not critical and may range from about −30° C. to about 100° C. or higher. Superior polymerizations are obtained at temperatures between about 0° and 90° C. The polymerization will generally be conducted at a pH of about 7 or lower. Polymerization modifiers such as primary, secondary and tertiary mercaptans, buffers, electrolytes and the like, may also be present during the polymerization.

Especially effective adhesive lattices are obtained through overpolymerization of the acid monomer. All or at least part of the carboxyl functionality will be present in the overpolymerized portion of the polymer to obtain highly efficient thickenable adhesive lattices The $\alpha,\beta$-olefinically unsaturated carboxylic acid monomer is overpolymerized on an acrylic base polymer. Lattices of this type which have proved particularly useful in the present spray process contain about 0.1 to 10 percent by weight of an $\alpha,\beta$-olefinically unsaturated carboxylic acid monomer overpolymerized on a base polymer. The polymer will contain in addition to the overpolymerized acid monomer about 50 to 99.9 percent by weight based on the total monomers of an ester of an $\alpha,\beta$-olefinically unsaturated carboxylic acid and up to about 49 percent by weight of one or more other polymerizable vinylidene comonomers. Preferably the vinylidene comonomer will be 0.5 to 35 percent by weight of acrylonitrile, methacrylonitrile, acrylamide or methacrylamide or 0.5 to 15 percent by weight of an $\alpha,\beta$-olefinically unsaturated N-alkylol amide of the formula

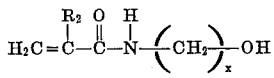

wherein $R_2$ is hydrogen or an alkyl group containing one to four carbon atoms and $x$ is a number from one to four and more particularly compounds such as N-methylol acrylamide, N-ethanol acrylamide, N-propanol acrylamide, N-methylol methacrylamide and N-ethanol methacrylamide. One or more other vinylidene monomers may also be used in conjunction with the preferred comonomers set forth above.

Especially useful polymer binder lattices are obtained when the acid monomer is overpolymerized onto the base polymer in combination with small amounts of other polymerizable vinylidene comonomers, including acrylic esters. When the vinylidene comonomers are employed in an amount so that the weight ratio of vinylidene monomer to the acid monomer overpolymerized is less than about 5:1 lattices having a high degree of thickening efficiency are obtained and also the amount of coagulum obtained during a polymerization is kept at a minimum. Highly efficient polymer lattices are obtained when the vinylidene comonomer to acid monomer weight ratio is maintained at 1:1 or below.

The same monomers interpolymerized to form the base polymer may also be employed in conjunction with the acid monomer in the overpolymerization step, or different monomers may be employed. Small amounts of esters of acrylic or methacrylic acid such as methyl acrylate, ethyl acrylate and methyl methacrylate have been found especially useful for the overpolymerization step. Further advantage is often realized when small amounts of polyfunctional compounds such as methylene bisacrylamide, ethyleneglycol dimethacrylate, diethyleneglycol diacrylate, allyl pentaerythritol, divinyl benzene or the like are included in the overpolymerization step. Polymer lattices especially suited for the present spray process, having superior stability and capable of developing extremely high viscosity upon treatment with very dilute concentrations of base can be obtained in this manner.

To obtain such polymer lattices having maximum thickening efficiency, the overpolymerization or grafting of the acid monomer onto the base polymer is commenced when the polymerization of the base polymer is complete or essentially complete. It is convenient in carrying out the process if the overpolymerization is conducted after at least 50 percent conversion of the base monomers has been achieved. Excellent results are obtained when the overpolymerization is delayed until about 70 percent or more of the base monomers have been polymerized. When the overpolymerization step is delayed until a very high percentage of the base monomers have been polymerized, it then becomes particularly advantageous to combine a small amount of another comonomer, as described previously, with the acid monomer. Conventional emulsifying agents, initiators, modifiers or the like can be employed for both the base polymerization and overpolymerization steps.

Polymer lattices useful for the present spray process, either conventionally copolymerized or overpolymerized, are not limited to acrylic ester-based systems. Other carboxylic-containing lattices such as those obtained with butadiene may also be successfully employed. Useful carboxylated binder lattices of this type will contain about 15 to 100 percent by weight butadiene, preferably interpolymerized with up to about 70 percent by weight styrene or up to about 2 percent by weight acrylonitrile. Additionally these butadiene-based lattices may contain up to about 40 percent by weight, or more, of one or more other copolymerizable vinylidene comonomers such as described previously. The butadiene polymers will contain about 0.5 to 15 percent by weight of the acid monomer interpolymerized or overpolymerized. An especially useful polymer latex for the purpose of the present invention contains about 50 to 70 percent by weight butadiene, 20 to 45 percent by weight styrene or acrylonitrile, 1 to 5 percent acrylic or methacrylic acid and up to about 20 percent by weight other polymerizable comonomers. The styrene and acrylonitrile may be interpolymerized with the other monomers or they may be introduced into the latex system as homopolymers and blended with a butadiene latex.

As previously pointed out it is not necessary for the carboxyl functionality to be an integral part of the adhesive polymer latex. The carboxyl functionality can be introduced into the adhesive latex by physical mixture or blending with a polymeric thickening agent containing carboxyl functionality. It is therefor possible to employ binder lattices which contain no carboxyl functionality or insufficient carboxyl functionality to be appreciably thickened upon treatment with base, if a carboxylic-type thickener is added thereto in an amount so that 0.01 to 25 percent by weight carboxyl functionality, based on the total polymer composition, is present.

The carboxylic thickeners can be water soluble salts of copolymers obtained by the polymerization of an $\alpha,\beta$-olefinically unsaturated carboxylic acid with one or more esters thereof, or a copolymer of an $\alpha,\beta$-olefinically unsaturated carboxylic acid with a polyalkenyl polyether of a polyhydric alcohol. Such polymeric carboxylic thickening agents are blended with conventional lattices, acrylic ester derived or otherwise, to obtain adhesive lattices useful for the present spray process.

Useful carboxylic thickeners derived from an $\alpha,\beta$-olefinically unsaturated carboxylic acid and esters thereof contain about 15 to 70 percent by weight methacrylic acid interpolymerized with about 30 to 85 percent by weight of an ester of an $\alpha,\beta$-olefinically unsaturated carboxylic acid. More useful compositions of this type contain about 35 to 65 percent by weight methacrylic acid and about 40 to 65 percent by weight of the ester. Such esters include those derived from alcohols containing from one to eight carbon atoms such as methanol, ethanol, propanol, isopropanol, n-butanol, sec-butanol, t-butanol, cyclohexanol and octanol and preferably will be derived from either acrylic or methacrylic acid. If the acrylic ester is ethyl acrylate the copolymers will generally contain about 40 to 55 percent methacrylic acid. If the acrylic ester is methyl acrylate, about 35 to 55 percent by weight methacrylic acid will be present. Mixtures of one or more of the acrylic esters may be employed with the methacrylic acid. Ethyl acrylate and methyl methacrylate are particularly effective in combination if the copolymer composition additionally contains about 0.1 to about 0.8 percent by weight of a suitable crosslinking monomer such as methylene bisacrylamide, ethyleneglycol dimethacrylate, diethyleneglycol diacrylate, allyl pentaerythritol, divinyl benzene or the like.

The carboxylic thickeners derived from $\alpha,\beta$-olefinically unsaturated carboxylic acids and polyalkenyl ethers of polyhydric alcohols, such as described in U.S. Pat. No. 2,798,053, may also be admixed with conventional polymer lattices and used for the present spray process. $\alpha,\beta$-Olefinically unsaturated carboxylic acid monomers preferably employed in such copolymer compositions will be acrylic acid, itaconic acid, maleic acid and fumaric acid and the polyhydric alcohol will preferably contain four carbon atoms and at least three hydroxyl groups. The polyether will contain more than one alkenyl group per molecule.

To obtain laminates having improved resistance to delamination the adhesive latex containing carboxyl functionality is sprayed onto the surface of the material to be laminated in such a way that the latex is deposited as discrete droplets, that is, as a discontinuous layer. No special spray apparatus is required to spray the latex, since as it is being sprayed, the viscosity is generally never greater than 2,000 c.p.s.

Since the adhesive latex, as sprayed, has a very low viscosity any conventional spray means capable of producing atomization of the latex can be employed. The particular spray equipment used to disperse the fluid latex is not critical and can be varied in accordance with well established principles of spray application. The average droplet size (diameter) after deposition on the substrate will range between about 0.0005 inch and 0.05 inch and more preferably from about 0.001 inch to 0.02 inch. Any combination or variation of spray equipment capable of producing such a droplet size can therefor be used. Pneumatic atomization of the latex with pressurized air, steam or any other gas is a simple and convenient means for spraying. However, other means such as electrical and electrostatic atomizers, the use of vibrating plates and transducers, centrifugal force of spinning discs, rotating cups or nozzles, impact or impingement of the liquid jet on a solid surface or into another jet may also be effectively employed and are completely acceptable for the present process. With external mixing methods, that is, where there is no internal communication between the gas and the adhesive latex prior to passage through the nozzle, the gas employed for atomization can be ammonia or amine by themselves or in admixture with air or some other gaseous diluent. In this way the basic atmosphere could be generated by an inherent feature of the spray procedure. Such a technique could also be readily adapted for use with duplex, dual orifice, impinging jet and aspirating type spray systems. It could be used not only with gaseous ammonia or amine but also with ammonium hydroxide or amine solutions depending on the spray system used.

Once it is established that the spray means is capable of producing the required droplet size, the application of the proper amount of the adhesive latex (pickup) will depend on the operator, if hand application is used, or, when continuous spray techniques are used, the rate of movement of the substrate in relation to the spray or the movement of the spray with relation to the substrate. The latex pickup can be varied over a wide range so long as the amount does not equal or exceed that required to form a continuous layer of the adhesive latex. Average droplet densities obtained with the spray process can range between about 500,000 and 400 droplets/inch$^2$ Excellent laminates are obtained when the adhesive latex droplet density is between about 40,000 and 1,000 droplets/inch$^2$.

Since it is the object of the present spray process, in addition to providing a quick and economical means for applying adhesive latex as discrete droplets, to obtain improved laminates over previously known mechanical methods, it is most desirable that the average diameter of the latex droplets be small. In this way a much higher latex adhesive droplet density per unit area of laminate is obtained and, as it has unexpectedly been found, increased resistance to delamination of the bonded materials is obtained. The latter is true even though the amount of adhesive latex deposited with the present spray process is often much less than when larger dots or a continuous film are applied, as with mechanical processes.

To initially apply the unthickened adhesive latex as discrete droplets is no particular problem and can be varied in accordance with principles known to the art. Adhesive lattices containing up to about 70 percent total polymer solids can be conveniently sprayed. However, for the present spray process to be effective the adhesive latex must be maintained as discrete droplets after deposition to prevent it from coalescing and forming a continuous layer which results in the production of an inferior laminate. To maintain the adhesive latex as discrete, raised droplets it is necessary that the latex have a high viscosity upon contact with the substrate. Accordingly, the viscosity must be increased from about 2,000 c.p.s. or lower to about 10,000 c.p.s. or more while in transit from the spray nozzle to the substrate. It is not satisfactory that the latex be thickened after contacting the substrate since the velocity of the latex droplets is such that if allowed to contact the substrate in their original unthickened state (low viscosity) they will spatter and lose their integrity.

To achieve the necessary degree of thickening of the latex droplets, the adhesive latex droplets are passed through a basic atmosphere, the concentration of basic material within the atmosphere being sufficient to impart the necessary increase in viscosity to the carboxylic adhesive latex. The spraying may therefor be conducted in a closed chamber wherein a fixed concentration of the basic material can be maintained or it can simply be sprayed through the basic atmosphere. Acceptable results are obtained in both instances, however, the latter technique is particularly advantageous when noncontinuous operation is desired and where the more volatile basic compounds are used.

Basic compounds utilized for the present invention are ammonia or amines, either primary, secondary or tertiary. Since the basic compound must be available in the atmosphere in sufficient concentration to react with the carboxyl functionality of the binder latex if the desired degree of thickening is to be achieved, ammonia and the more volatile amines containing up to about 20 carbon atoms are most advantageously employed. Amines capable of exerting a vapor pressure of about 760 mm. Hg at about 120° C. or below are generally considered to be acceptable for the present process. Excellent results have been obtained with ammonia and amines containing up to about eight carbon atoms which are gaseous at room temperature or slightly above. Typical of the amines useful for the present process are: methyl amine, ethyl amine, n-propyl amine, isopropyl amine, isobutyl amine, isoamyl amine, hexyl amine, octyl amine, lauryl amine, dimethyl amine, diethyl amine, di-n-propyl amine, di-n-butyl amine, diisoamyl amine, trimethyl amine, triethyl amine, tri-n-propyl amine and the like. In addition to the monoamines, polyamines such as ethylenediamine, triethylenetriamine or the like may also be employed.

The advantage of laminates obtained by the present spray process over standard mechanical methods of application has been demonstrated. When an unthickened adhesive latex of the type described hereinabove was applied with a conventional spray apparatus having 10 p.s.i.g. air on the can and 16 p.s.i.g. air on the gun in accordance with the present process, about 8,000 droplets/inch$^2$ were obtained with an average size of about 0.005 inch (diameter). When the same latex, which was necessarily thickened in accordance with the manufacturer's specifications to a viscosity of 18,500 c.p.s. was applied to an identical substrate with well-known commercial transfer roll apparatus only about 1,200 latex droplets/inch$^2$ were obtained and the average size of these deposits was 0.017 inch (diameter). This difference in droplet density and average droplet size was reflected in the physical characteristics, particularly the dry peel adhesion strengths, of the laminates which were identically cured. Dry peel adhesion values for the laminate obtained using the spray process were as much as 75 percent higher than with laminates prepared using the transfer roll method. Wet and solvent peel adhesion values of the laminates were also often improved. Since the average droplet of adhesive latex when applied by the spray process covers about 1/10 of the surface area covered by a normal droplet deposited by the transfer roll method, improved flexibility of the laminate results. In addition to this, the droplets of the spray process flow much less than the droplets deposited with the transfer roll method due to their increased viscosity and therefore have less of a tendency to conform to any surface irregularities. Due to rheological limitations the maximum adhesive latex viscosity which can be used with the transfer roll method is about 20,000 to 35,000 c.p.s. whereas the adhesive latex after deposition with the present spray process can achieve a much higher viscosity, often over 100,000 c.p.s.

The concentration of the ammonia or amine in the atmosphere through which the latex is sprayed determines to a large extent the ultimate viscosity of the adhesive latex droplets when they contact the substrate. Sufficient ammonia or amine must be present to react with the carboxyl functionality of the adhesive latex. All that is required is that the concentration of ammonia or amine be such that the viscosity of the latex be raised to about 10,000 c.p.s. or greater. Excellent results have been obtained when the ammonia or amine concentrations are such that the viscosity of the binder latex after deposition on the substrate is greater than about 40,000 c.p.s.

If the spray process is conducted in a closed system the concentration of the amine or ammonia can be controlled by metering devices or an equilibrium can be established during the application of the spray. The spraying can also be carried out in an open chamber or forced draft chamber where the ammonia or amine concentration cannot be so carefully controlled as long as the necessary degree of thickening can be achieved.

When a lower concentration of amine or ammonia is employed as in the open chamber or forced draft chamber, it may be desirable to further increase the viscosity of the latex after deposition by additional exposure of the binder latex to more ammonia or amine. Such post-treatment is not generally required since adequate thickening for most applications will be obtained with the initial spraying through the ammonia or amine atmosphere. Additional thickening can be accomplished by exposing the sprayed substrate to an atmosphere of ammonia or amine or by spraying aqueous ammonium hydroxide or the amine or amine solution onto the substrate. Extremely high viscosity within the latex droplets can be achieved in this manner. This latter technique can be used where extreme surface conditions exist. Also, the substrate can be impregnated with ammonium hydroxide or an amine prior to the spraying to obtain the same result.

The exact positioning of the amine or ammonia source is not critical so long as adequate exposure of the adhesive latex in the basic atmosphere is possible. The source of ammonia or amine may be under the substrate to be sprayed if the substrate is in a horizontal position and has sufficient porosity to allow the ammonia or amine to pass through. When spraying a substrate held in a vertical position, adequate exposure is obtained if the spray is passed over a bath positioned in front of the substrate and containing the amine or ammonia.

Although the process is more useful for the application of latex to certain materials, it is generally useful with any material. Any substrate to be laminated can be sprayed in accordance with the present invention. The process is particularly advantageous for use with textile substrates especially porous textiles, that is, those containing surface irregularities or which are absorbent, since with these latter materials it is especially undesirable to have unthickened aqueous polymer dispersions in contact with the substrate. The process is also useful for preparing laminates having large dimensions or curvilineal laminates. Substrates useful for preparing laminates in accordance with the present process include: open- and closed-cell materials derived from polyurethane, vinyl, natural rubber, neoprene, styrenebutadiene copolymer, polybutadiene or the like; woven and nonwoven fabrics obtained from natural fibers such as cotton, wool, silk, sisal, cantala, henequin, hemp, jute, kenaf, sunn and ramie; woven and nonwoven fabrics derived from synthetic fibers or filaments such as rayon (viscose), cellulose esters such as cellulose acetate and cellulose triacetate, proteinaceous fibers such as those derived from casein, polyamides such as those derived from the condensation of adipic acid and hexamethylene diamine or the like, polyesters such as polyethylene glycol terephthalate, acrylic fibers containing a minimum of about 85 percent acrylonitrile with vinyl chloride, vinyl acetate, vinyl pyridene, methacrylonitrile or the like and the modacrylic fibers which contain lesser amounts of acrylonitrile, copolymers of vinyl chloride with vinyl acetate or vinylidene chloride, the formal derivatives of polyvinyl alcohol, and olefin polymers such as polyethylene and polypropylene; lead; paper; wood; cork; metal and plastic foils; glass; elastomeric materials; and the like.

The following Examples serve to illustrate the invention more fully. In these Examples all parts and percentages are on a weight basis unless otherwise indicated. Latex viscosities reported were obtained with a Brookfield RVF viscometer at 20 r.p.m. with appropriate spindles.

EXAMPLE I

To demonstrate the present spray process and the improved laminates obtained thereby, a carboxyl-containing adhesive latex obtained by overpolymerizing methacrylic acid onto a base polymer was prepared in accordance with the following recipe:

| Monomer | Parts |
|---|---|
| Ethyl acrylate | 48.8 |
| 2-Ethylhexyl acrylate | 45.0 |
| N-methylol acrylamide | 1.8 |
| Acrylamide | 1.8 |
| Methacrylic acid | 2.6 |
| Methylene bisacrylamide | 0.005 |

The polymerization reactor was first charged with about 63 parts of water and about 10 percent of a premix containing the ethyl acrylate, 2-ethylhexyl acrylate, N-methylol acrylamide and acrylamide, 30 parts water and 0.2 part sodium lauryl sulfate. The reactor and its contents were then heated to about 60°–70° C. and 0.26 part ammonium persulfate dissolved in one part water charged with vigorous agitation. The remainder of the monomer premix was proportioned into the reactor over a period of about one hour while maintaining the temperature at about 80° C. At the completion of this proportioning, a second monomer premix containing the methacrylic acid and methylene bisacrylamide emulsified with 0.1 part sodium lauryl sulfate in 3 parts water was charged at a uniform rate in about fifteen minutes. The polymerization was maintained at 80° C. for an additional hour to insure complete conversion of the monomers. The resulting fluid latex (50 percent total solids) was essentially free of coagulum and had excellent stability.

The adhesive latex was applied to a face fabric to be laminated as discrete droplets utilizing two procedures. Peel adhesion strengths of the resulting laminates were then measured. In addition to comparing the physical properties of the laminates obtained, droplet size, droplet density and viscosity of the latex droplets obtained by both methods were also compared.

Utilizing the procedure of the present invention (hereinafter method "A"), the adhesive latex was applied to a standard wool face fabric using a conventional spray gun (Devilbiss Type MBC 75990L) having a fluid tip AB–5D, aircap 24L and fluid needle D–EX MBC 190. The adhesive latex was sprayed with 10 p.s.i.g. air on the can and 16 p.s.i.g. air on the gun onto the face fabric which was clamped in a vertical position in a forced draft chamber equipped with an exhaust fan at the top. A 28 percent ammonium hydroxide bath was placed between and slightly below the fabric and the spray gun nozzle. While spraying the exhaust fan was used to draw the ammonium vapors upward from the bath so that the adhesive latex passed through the ammonia vapor prior to deposition on the face fabric.

Laminates were prepared for comparative purposes by Method "B" which employed a conventional laminating machine equipped with transfer roll to deposit the adhesive latex in discrete spots as described in U.S. Pat. No. 3,313,668. The laminating apparatus employed was the same as described in U.S. Pat. No. 3,330,717. The viscosity of the adhesive latex was raised to 18,500 c.p.s. prior to application by the addition of 1 percent ammonium hydroxide.

The average droplet density obtained with the adhesive latex for both method A and method B was determined by adding a black pigment dispersion (Aquablack K) to the latex prior to application. After application to the face fabric adhesive latex was dried and cured and representative unit areas marked off and the number of droplets in unit area counted with the aid of a magnifier. With method A, 7,924 droplets/inch$^2$ were deposited whereas only 1,152 droplets/inch$^2$ were obtained using method B. Thus the spray process of the present invention (A) gave approximately 7 times more points of possible adhesion per unit area of laminate than the transfer roll method (B). Employing the same similar procedure, the average droplet size was determined in a unit area. The average droplet diameter of adhesive latex deposited using method A was 0.005 inch. The average droplet size obtained with method B was 0.017 inch (diameter).

The viscosity of the adhesive latex droplets applied with method A, as determined by observing the pH of the latex after deposition on the fabric and then adjusting the pH of the same latex to the identical pH and measuring the viscosity, was about 70,000 c.p.s. This is considerably greater than the 18,500 c.p.s. maximum viscosity required for deposition with method B. Due to this marked difference in viscosity the adhesive droplets applied with the spray process have much less tendency to flow or penetrate after application.

To demonstrate the ability of the spray process to provide laminates having superior resistance to delamination, laminates of wool/acetate and nylon were prepared using the above-prepared adhesive latex and employing both the spray process of method A and the transfer roll method B. A wool face fabric was laminated to the backing fabric in a mangle heated to approximately 200° F. The laminate was then cured in a hot air oven for 1½ minutes at 300° F. Tensile values (peel adhesion) for the laminates were determined with a Thwing-Albert tensile tester by pulling 1 inch ×6 inch samples at a rate of 12 inch per minute. The wet tensile values were determined on samples which had been soaked in 180° F. water for one hour. The solvent tensiles were determined after the samples had soaked for 20 minutes in room temperature perchloroethylene. Laminates prepared in accordance with method A but with additional exposure to ammonia were also prepared and tested.

Table I sets out the data obtained for these laminates. Pickup, dry tensile, wet tensile and solvent tensile are reported.

TABLE I

| Method | Backing fabric | Pick-up (oz./in.$^2$) | Dry tensile (oz./in.) | Wet tensile (oz./in.) | Solvent tensile (oz./in.) |
|---|---|---|---|---|---|
| A | Nylon | .017 | 44.0 | 16.5 | |
| A$^1$ | do | .030 | 39.0 | 14.3 | |
| B | do | .016 | 16.0 | 14.0 | |
| A | Acetate | .022 | 37.0 | 2.5 | 5.5 |
| A$^1$ | do | .026 | 51.0 | 1.5 | 5.3 |
| B | do | .014 | 18.0 | 2.0 | 2.0 |

$^1$ Additional exposure to ammonia after spraying.

It is evident from table I that a marked improvement in the dry peel adhesion (resistance to delamination) of the laminates prepared using the spray process of the present invention is obtained. More than a twofold increase in the dry tensile values is observed employing approximately the same amount of adhesive latex. Also it is evident that improvement of both the wet tensile and solvent tensile of laminates prepared by method A is also obtained. The laminates prepared using method A had good flexibility and hand.

EXAMPLE II

Employing an overpolymerization procedure similar to that described in example I, a base polymer comprising 83.5 parts 2-ethylhexyl acrylate, 1.0 part N-methylol acrylamide, 3.5 parts acrylamide and 12.0 parts acrylonitrile was overpolymerized with 3.0 parts methacrylic acid. The resulting polymer latex was used for laminating a wool face fabric to nylon using the procedure of method A. Additionally, laminates were also prepared using the transfer roll apparatus (method B). Pickup and tensile values for these laminates are reported in table II.

Table II

| Method | A | B* |
|---|---|---|
| Pickup (oz./in.$^2$) | 0.26 | 0.21 |
| Dry tensile (oz./in.) | 33.5 | 18.0 |
| Wet tensile (oz./in.) | 10.0 | 5.5 |
| Solvent tensile (oz./in.) | 4.5 | 3.3 |

*Latex thickened to 17,500 cps. prior to application.

Laminates were also prepared using method A but with additional exposure to ammonia. The laminates were superior in all respects to the laminates obtained using the transfer roll apparatus. Similar improved results were obtained with wool/acetate laminates prepared using the same adhesive latex and applied with the spray process of the present invention.

The above latex adhesive system was also investigated with the spray process to prepare laminates with the following substrates: 10 mil paper having a minimum fiber-fiber contact, split hide leather, yellow pinewood panel, crepe paper, needle punched nonwoven fabric, key punched nonwoven fabric, polyurethane foam and glass plate. The present spray process was suitable for use with all of the above-mentioned substrates. The latex adhesive droplets were deposited as discrete droplets which had excellent hold-out after deposition.

EXAMPLE III

A base polymer comprised of 80.5 parts n-butyl acrylate, 3.0 parts acrylonitrile, 3.5 parts acrylamide and 1.0 part N-methylol acrylamide was overpolymerized with 3 parts methacrylic acid and 0.005 part methylene bisacrylamide. The overpolymerization was conducted in accordance with the description of example I. The resulting latex was used to laminate wool to nylon and wool to acetate. Laminates prepared using method A had improved peel adhesion values over the laminates prepared using the transfer roll method (B) with the latex thickened to 19,500 c.p.s. Tensile values obtained are set forth in table III.

Table III

| Method | A | B |
|---|---|---|
| Wool/Nylon: | | |
| Dry tensile (oz./in.) | 47.0 | 32.0 |
| Wet tensile (oz./in.) | 7.0 | 4.3 |
| Solvent tensile (oz./in.) | 11.5 | 10.0 |
| Wool/Acetate: | | |
| Dry tensile (oz./in.) | 30 | 23.0 |
| Wet tensile (oz./in.) 2.0 | | 1.8 |
| Solvent tensile (oz./in.) | 6.5 | 3.5 |

Similar improved laminates were obtained using the spray process of method A with the instant latex system but substituting various amines for the ammonium hydroxide. Methyl amine, ethyl amine, trimethyl amine, diethyl amine and triethyl amine were all successfully substituted in method A with no difficulty. In all instances the latex was thickened so that upon deposition the droplets remained as raised, spaced deposits. Dry peel adhesion of the resulting laminates was significantly improved over values obtained with laminates prepared using the transfer roll method (B).

EXAMPLE IV

A conventional copolymerization was conducted with sodium lauryl sulfate emulsifier and a potassium persulfate initiator system to obtain a copolymer adhesive latex (X) comprising 75 parts of a mixture of lower alkyl acrylates, 10 parts acrylonitrile and 4.5 parts of a mixture of acrylamides. Carboxyl functionality was introduced into the copolymer latex (X) by overpolymerizing thereon 2.5 parts methacrylic acid. The overpolymer latex was designated latex (Y). Additionally, carboxyl functionality was introduced by blending (X) with a carboxyl-containing polymeric thickener. Five parts of the thickener (70 percent alkyl acrylate—30 percent methacrylic acid) was blended with 100 parts latex (X) and the resulting latex identified as latex (Z). Dry, wet and solvent tensiles were determined for laminates obtained with each of the three above-described latex systems using method A and method B. The results are tabulated in table IV.

Table IV

| Latex | Application Method | Fabrics | Dry Tensile | Wet Tensile | Solvent Tensile |
|---|---|---|---|---|---|
| X | A | wool/nylon | 14 | 6 | 4 |
| Y | A | wool/nylon | 119 | 36 | 32 |
| Y | B | wool/nylon | 80 | 36 | 28 |
| Y | A | wool/acetate | 67* | 14 | 18 |
| Y | B | wool/acetate | 58 | 12 | 12 |
| Z | A | wool/nylon | 78 | 20 | 18 |
| Z | B | wool/nylon | 55 | 20 | 11 |

*acetate failed

Wool/nylon laminates having similar improved resistance to delamination were obtained when about 1 part acrylic acid was added to the copolymerization process utilized for the preparation of Latex (X). The laminate tensile values were intermediate to those obtained with latex (Y) and latex (Z) employing the process of the present invention.

We claim:

1. A process for applying an aqueous adhesive polymer latex to a substrate as raised, spaced deposits which comprises spraying an aqueous adhesive polymer latex containing from about 0.1 to 25 percent by weight carboxyl functionality based on the total polymer composition through a basic atmosphere, the concentration of the basic compound in the atmosphere being sufficient to raise the viscosity of the latex droplets to at least 10,000 centipoise, and onto a substrate so that the latex droplets deposited have an average diameter of about 0.0005 inch to about 0.05 inch and the average droplet density is between about 500,000 and 400 droplets/inch$^2$.

2. The process of claim 1 wherein the adhesive polymer latex contains contains (a) one or more $\alpha,\beta$-olefinically unsaturated carboxylic acid monomers containing from three to 12 carbon atoms, (b) an acrylic ester of the formula

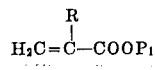

wherein R is selected from hydrogen, methyl or ethyl and $R_1$ is a hydrocarbon radical containing from one to 12 carbon atoms and (c) up to 49 percent by weight based on total polymer composition of one or more vinylidene comonomers, interpolymerized.

3. The process of claim 1 wherein the basic compound is selected from the group consisting of ammonia or an amine containing up to about 20 carbon atoms.

4. The process of claim 1 wherein the viscosity of the latex droplets is greater than about 40,000 centipoise, the basic compound is selected from the group consisting of ammonia or an amine containing up to about 20 carbon atoms and the adhesive polymer latex contains one or more $\alpha,\beta$-olefinically unsaturated carboxylic acid monomer containing from 3 to 12 carbon atoms interpolymerized with (b) an acrylic ester of the formula

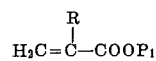

wherein R is selected from hydrogen, methyl or ethyl and $R_1$ is an alkyl radical containing from 1 to 8 carbon atoms and (c) up to 40 percent by weight one or more vinylidene comonomers.

5. The process of claim 4 wherein the average diameter of the adhesive latex deposits is between about 0.001 inch and about 0.02 inch.

6. The process of claim 5 wherein the basic compound is ammonia or an amine containing up to about 8 carbon atoms.

7. The process of claim 6 wherein the adhesive polymer latex contains about 50 to 99.9 percent by weight (b), (c) is selected from the group consisting of acrylonitrile, methacrylonitrile, acrylamide, methacrylamide or a compound having the formula

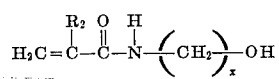

wherein $R_2$ is hydrogen or an alkyl group containing from one to four carbon atoms and $x$ is an integer from 1 to 4, and about 0.1 to 10 percent by weight methacrylic acid or acrylic acid overpolymerized.

8. The process of claim 5 wherein the adhesive polymer latex is sprayed onto a textile substrate and the average droplet density is between about 40,000 and 1,000 droplets/inch$^2$ 9. The process of claim 8 wherein the basic compound is ammonia or an amine containing up to about eight carbon atoms.

10. The process of claim 9 wherein after deposition of the adhesive latex the textile substrate is additionally exposed to ammonia or amine prior to lamination.

11. The process of claim 1 wherein a second layer is bonded to the adhesive surface of said substrate.

* * * * *

PO-1050
(5/69)

UNITED STATES PATENT OFFICE
CERTIFICATE OF CORRECTION

Patent No. 3,625,795          Dated December 7, 1971

Inventor(s) Donald P. Knechtges and Andrew N. Mayak

It is certified that error appears in the above-identified patent and that said Letters Patent are hereby corrected as shown below:

Column 14, lines 6-9, in the formula, "$COOP_1$" should read ---$COOR_1$---; Column 14, lines 26-29, in the formula, "$COOP_1$" should read ---$COOR_1$---.

Signed and sealed this 23rd day of January 1973.

(SEAL)
Attest:

EDWARD M. FLETCHER, JR.          ROBERT GOTTSCHALK
Attesting Officer          Commissioner of Patents